United States Patent
Taoka et al.

(10) Patent No.: US 10,344,991 B2
(45) Date of Patent: Jul. 9, 2019

(54) AIR SUCTION APPARATUS AND AIR SUCTION METHOD

(71) Applicant: Panasonic Intellectual Property Management Co., Ltd., Osaka (JP)

(72) Inventors: Hiroki Taoka, Kyoto (JP); Hiroyuki Kayama, Osaka (JP); Ichiro Takei, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 416 days.

(21) Appl. No.: 15/196,034

(22) Filed: Jun. 29, 2016

(65) Prior Publication Data

US 2017/0010008 A1    Jan. 12, 2017

(30) Foreign Application Priority Data

Jul. 8, 2015  (JP) ................................. 2015-137005
Mar. 23, 2016 (JP) ................................. 2016-058524

(51) Int. Cl.
  *F24F 11/62* (2018.01)
  *F24F 3/16* (2006.01)
  (Continued)

(52) U.S. Cl.
  CPC ............ *F24F 3/1603* (2013.01); *F24F 11/30* (2018.01); *F24F 11/62* (2018.01); *F24F 11/77* (2018.01);
  (Continued)

(58) Field of Classification Search
  CPC ..................................... F24F 3/16; F24F 11/62
  (Continued)

(56) References Cited

U.S. PATENT DOCUMENTS 5,388,426 A * 2/1995 Wada .................... F24F 1/0007
                                                          62/263
5,559,673 A * 9/1996 Gagnon .................... G06F 1/20
                                                          165/122

(Continued)

FOREIGN PATENT DOCUMENTS

JP       11-311429        11/1999
JP       2009-172509      8/2009

OTHER PUBLICATIONS

Yasunori Saito, "Laser-induced Fluorescence Lidar for the Use of Monitoring Multiple Environmental Components Surrounding The Livingsphere" The Laser Society of Japan, vol. 39, No. 8, 2011, pp. 590-595 (Partial Translation).

*Primary Examiner* — Steven B McAllister
*Assistant Examiner* — Samantha A Probst
(74) *Attorney, Agent, or Firm* — Greenblum & Bernstein, P.L.C.

(57) ABSTRACT

An air suction apparatus includes an air suction port that is variable in an air suction mode including at least one of a shape, a size, a direction, an effective opening area, a position, or an air flow volume of an air suction port and an air suction controller that controls, according to a change in a dust concentration distribution in a periphery of the air suction port, the air suction port to vary at least one of the shape, the size, the direction, the effective opening area, the position, or the air flow volume of the air suction port such that an air suction flow distribution is changed according to the variation of the air suction mode.

10 Claims, 14 Drawing Sheets

(51) Int. Cl.
  *F24F 13/20* (2006.01)
  *F24F 11/30* (2018.01)
  *F24F 11/79* (2018.01)
  *F24F 11/77* (2018.01)
  *F24F 110/64* (2018.01)
  *F24F 120/12* (2018.01)
  *F24F 110/30* (2018.01)
  *F24F 11/63* (2018.01)

(52) U.S. Cl.
  CPC .............. *F24F 11/79* (2018.01); *F24F 13/20* (2013.01); *F24F 11/63* (2018.01); *F24F 2003/1614* (2013.01); *F24F 2110/30* (2018.01); *F24F 2110/64* (2018.01); *F24F 2120/12* (2018.01); *Y02A 50/21* (2018.01)

(58) Field of Classification Search
  USPC ........................................................ 454/229
  See application file for complete search history.

(56) References Cited

U.S. PATENT DOCUMENTS

| | | | | | |
|---|---|---|---|---|---|
| 5,746,655 | A * | 5/1998 | Lee | | F24F 13/06 454/233 |
| 5,782,688 | A * | 7/1998 | Baek | | F24F 1/0011 454/233 |
| 5,807,170 | A * | 9/1998 | Lee | | F24F 1/0007 454/233 |
| 5,810,658 | A * | 9/1998 | Seo | | F24F 13/06 454/233 |
| 5,810,660 | A * | 9/1998 | Lee | | F24F 13/06 454/233 |
| 5,857,343 | A * | 1/1999 | Cho | | F24F 1/0007 454/236 |
| 5,868,617 | A * | 2/1999 | Kim | | F24F 1/0007 454/233 |
| 6,189,831 | B1 * | 2/2001 | Asai | | B64D 11/0023 244/118.5 |
| 7,334,424 | B2 * | 2/2008 | Park | | F24F 1/0007 454/187 |
| 7,703,294 | B2 * | 4/2010 | Nakamura | | F24F 1/0007 62/262 |
| 9,581,379 | B2 * | 2/2017 | Ikeda | | F24F 1/0007 |
| 9,657,962 | B2 * | 5/2017 | Mosley | | F24F 13/08 |
| 9,759,445 | B2 * | 9/2017 | Kim | | F24F 13/10 |
| 9,857,095 | B2 * | 1/2018 | Hirakawa | | F24F 13/20 |
| 2003/0129936 | A1 * | 7/2003 | Shaikh | | B08B 15/02 454/63 |
| 2004/0253917 | A1 * | 12/2004 | Kim | | E06B 7/10 454/200 |
| 2005/0166355 | A1 * | 8/2005 | Tani | | A47L 9/2805 15/319 |
| 2006/0111036 | A1 * | 5/2006 | Leask | | F24F 3/1607 454/253 |
| 2007/0060036 | A1 * | 3/2007 | Shibuya | | B01D 46/0065 454/187 |
| 2007/0095649 | A1 * | 5/2007 | Barlow | | C01B 13/10 204/176 |
| 2007/0202798 | A1 * | 8/2007 | Billiotte | | F24F 3/16 454/264 |
| 2007/0213002 | A1 * | 9/2007 | Okamoto | | B01D 39/1623 454/233 |
| 2009/0090125 | A1 * | 4/2009 | Seki | | F24F 11/79 62/407 |
| 2009/0098820 | A1 * | 4/2009 | Yabu | | F24F 1/0011 454/333 |
| 2010/0159818 | A1 * | 6/2010 | Sakashita | | F24F 13/28 454/233 |
| 2010/0186357 | A1 * | 7/2010 | Takeda | | F24F 3/1603 55/471 |
| 2010/0317282 | A1 * | 12/2010 | Okada | | F24F 1/0007 454/292 |
| 2011/0159596 | A1 * | 6/2011 | Keinan | | G01N 1/2211 436/52 |
| 2011/0203350 | A1 * | 8/2011 | Kaminski | | G01N 1/2205 73/28.04 |
| 2012/0012297 | A1 * | 1/2012 | Nakagawa | | F24F 11/0012 165/247 |
| 2012/0040600 | A1 * | 2/2012 | Ortner | | A41D 13/02 454/187 |
| 2012/0135674 | A1 * | 5/2012 | Uehara | | F24F 1/0007 454/338 |
| 2012/0154348 | A1 * | 6/2012 | Okuno | | C12Q 1/06 345/204 |
| 2012/0164931 | A1 * | 6/2012 | Takeda | | F24F 1/0007 454/239 |
| 2012/0171947 | A1 * | 7/2012 | Takeda | | F24F 1/0007 454/251 |
| 2012/0199003 | A1 * | 8/2012 | Melikov | | A61G 10/02 95/273 |
| 2014/0094108 | A1 * | 4/2014 | Park | | F24F 7/007 454/341 |
| 2014/0308887 | A1 * | 10/2014 | Yoon | | F24F 13/08 454/284 |
| 2015/0075201 | A1 * | 3/2015 | Park | | F24F 1/0011 62/262 |
| 2015/0219359 | A1 * | 8/2015 | Mao | | F24F 1/0011 454/249 |
| 2015/0285515 | A1 * | 10/2015 | Lee | | F24F 1/0011 454/249 |
| 2015/0354850 | A1 * | 12/2015 | Iwano | | F24F 13/15 454/256 |
| 2016/0052364 | A1 * | 2/2016 | Sogawa | | B60H 1/00028 454/147 |
| 2016/0076790 | A1 * | 3/2016 | Kojima | | F24F 13/20 454/237 |
| 2016/0356519 | A1 * | 12/2016 | Choi | | F24F 11/0086 |
| 2017/0102296 | A1 * | 4/2017 | Sugaya | | G01N 1/2202 |

* cited by examiner

| SPACE PATTERN (321) | AIR BLOW MODE PATTERN (322) | AIR FLOW DISTRIBUTION PATTERN (323) |
|---|---|---|
| R1 | B1 | A1 |
| R1 | B2 | A2 |
| R1 | ⋮ | ⋮ |
| R2 | B1 | A7 |
| R2 | B2 | A8 |
| R2 | ⋮ | ⋮ |
| ⋮ | ⋮ | ⋮ |

| AIR SUCTION MODE PATTERN (341) | POSITION (342) | AIR SUCTION FLOW (343) |
|---|---|---|
| I1 | P1 | V11 |
|  | P2 | V12 |
|  | ⋮ | ⋮ |
| I2 | P1 | V21 |
|  | P2 | V22 |
|  | ⋮ | ⋮ |
| ⋮ | ⋮ | ⋮ |

AIR SUCTION APPARATUS AND AIR SUCTION METHOD

BACKGROUND

1. Technical Field

The present disclosure relates to an air suction apparatus that sucks air and an air suction method.

2. Description of the Related Art

Conventionally, an air suction apparatus, such as an air cleaner, that sucks air to remove dust floating in the air has been used. Such an air suction apparatus, for example, blows air from an air blow port, and sucks surrounding air in an air suction port and sends the sucked air to the air blow port to circulate air, and removes dust included in the air by an air filter disposed inside the air suction apparatus.

It is preferable to suck and remove dust as effectively as possible. Thus, for example, PTL1 discloses a technique for changing an air flow of suction air. The technique disclosed in PTL1 (hereinbelow, referred to as "conventional technique") changes a size of an overhang in a hood which covers an air suction port of an air suction apparatus in response to a button operation by a user. Accordingly, in the conventional technique, when a user smokes a cigarette under the air suction apparatus, rising smoke of the cigarette can be effectively guided to the air suction port.

CITATION LIST

Patent Literature

PTL 1: Unexamined Japanese Patent Publication No. H11-311429

Non-Patent Literature

NPL 1: SAITO Yasunori, "Laser-induced Fluorescence Lidar for the Use of Monitoring Multiple Environmental Components Surrounding the Livingsphere", The Review of Laser Engineering, Vol. 39, No. 8, The Laser Society of Japan, August 2011, PP. 590-595

However, the conventional technique requires a button operation by a user who knows generation of smoke. Further, the conventional technique does not improve a suction effect for dust other than dust that rises from a position under the air suction apparatus. Thus, there is desired a technique that particularly requires no user operation and enables a suction effect to be improved also for dust floating inside a room such as pollen and dirt.

SUMMARY

Thus, one non-limiting and exemplary embodiment of the present disclosure provides an air suction apparatus and an air suction method that can easily and effectively suck dust.

In one general aspect, the techniques disclosed here feature an air suction apparatus including an air suction port that is variable in an air suction mode including at least one of a shape, a size, a direction, an effective opening area, a position, or an air flow volume of an air suction port; and an air suction controller that controls, according to a change in a dust concentration distribution in a periphery of the air suction port, the air suction port to vary at least one of the shape, the size, the direction, the effective opening area, the position, or the air flow volume of the air suction port such that an air suction flow distribution is changed according to the variation of the air suction mode.

According to the present disclosure, it is possible to easily and effectively suck dust.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a device, a system, a method, an integrated circuit, a computer program, a storage medium, or any selective combination thereof.

BRIEF DESCRIPTION OF THE DRAWINGS

FIG. 6 is a diagram illustrating an example of contents of air flow information in the exemplary embodiment;

FIG. 9 is a diagram illustrating an example of air suction port information in the exemplary embodiment;

DETAILED DESCRIPTION

Hereinbelow, an exemplary embodiment of the present disclosure will be described in detail with reference to the drawings.

Outline of Apparatus

First, an outline of an air suction apparatus according to the present exemplary embodiment will be described.

Figure 1:
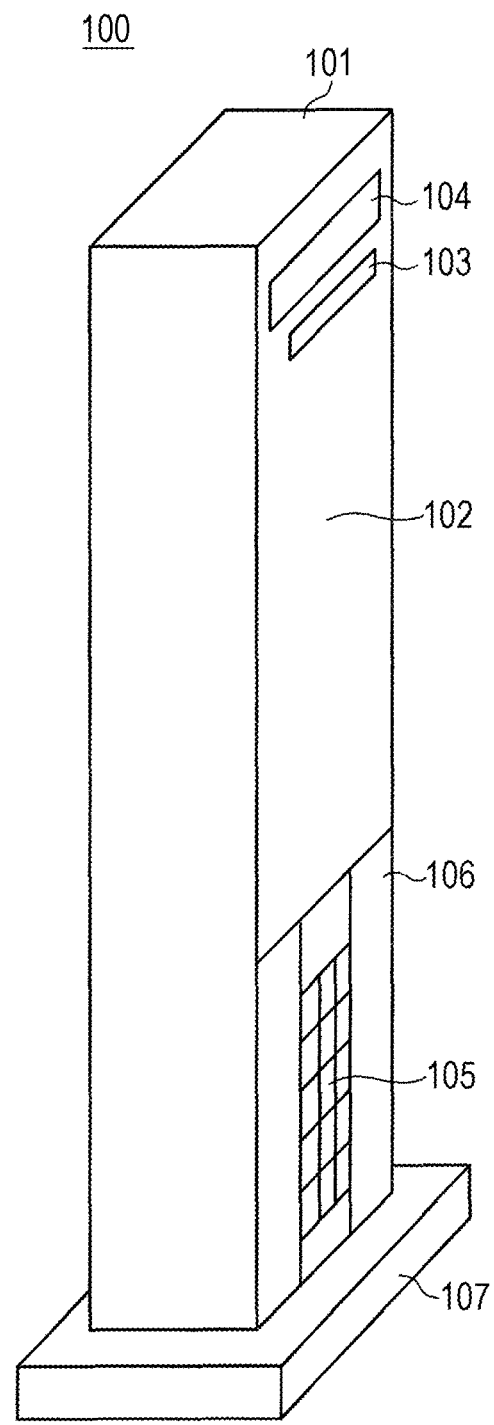
FIG. 1 is a perspective view illustrating an example of appearance of an air suction apparatus according to an exemplary embodiment of the present disclosure.

FIG. 1 is a perspective view illustrating an example of an appearance of the air suction apparatus according to the present exemplary embodiment.

As illustrated in FIG. 1, air suction apparatus 100 includes casing 101 which has principal face 102, sensor 103 and air blow port 104 which are disposed on an upper part of principal face 102, and air suction port 105 which is disposed on a lower part of principal face 102. Air suction apparatus 100 further includes movable opening 106 which is disposed on an outer side face of air suction port 105 and apparatus rotator 107 which is disposed on a lowest part of casing 101.

Casing 101 has, for example, a height of approximately 2 m, a width of approximately 50 cm, and a depth of approximately 20 cm. Although not illustrated, casing 101 is provided with a duct and an air fan which convey air from air suction port 105 to air blow port 104, and an air filter which removes dust from the conveyed air, the duct, the air fan and the air filter being disposed inside of casing 101.

In the present exemplary embodiment, "dust" indicates a fine particulate substance that is apt to adhere to a surface of a person or an object and apt to float in air such as dirt, pollen, sand, or ash, the substance being desirably removed from a space where air suction apparatus 100 is installed.

Sensor 103 includes, for example, a stereo sensor and detects a three-dimensional structure of the space where air suction apparatus 100 is installed and a three-dimensional position of a person who stays in the space. For example, it is possible to employ, as the stereo sensor, a device that captures stereo images by two monocular cameras to detect a corresponding point between images and calculates a three-dimensional position of each part shown on the image from parallax between the detected corresponding points.

Air blow port 104 is, for example, a horizontally-long louver provided with resin blades which are disposed in a horizontal direction and a vertical direction. Each of the blades of air blow port 104 is adjustable in angle by an electric motor (not illustrated). That is, an air blow direction of air blow port 104 is adjustable. In the present exemplary embodiment, air suction apparatus 100 is a complete circulation type apparatus that conveys all air sucked in air suction port 105 to air blow port 104 by the duct and the air fan.

Air suction port 105 is, for example, a rectangular louver provided with resin blades which are disposed in the horizontal direction and the vertical direction. Air suction port 105 has a size of, for example, 40 cm in height and 40 cm in width. Air suction port 105 has a region open in a space, and a size and a shape of the region are variable by movable opening 106 disposed on the outer side face of air suction port 105.

Movable opening 106 includes four shutters which are disposed on an upper side, a lower side, a right side, and a left side with respect to a center position of air suction port 105, and a slide mechanism and an electric motor (not illustrated) which cause these shutters to slide (move, or extend and contract) along a direction toward the center position of air suction port 105. Each of the shutters partially covers air suction port 105 according to a slide position. That is, movable opening 106 changes a size and a shape of air suction port 105 to change a spatial distribution (hereinbelow, referred to as "air suction flow distribution") of a velocity of an air flow (hereinbelow, referred to as "air suction flow") generated by suction of air by air suction port 105 in a periphery of air suction port 105.

In the present exemplary embodiment, the periphery of air suction port 105 indicates a range within which the air suction flow can expand. For example, the periphery of air suction port 105 is a range of distance within approximately 1 m from air suction port 105 when a suction airflow volume is 10 m³ per minute.

Apparatus rotator 107 includes a base which is placed on a floor, and a rotation mechanism and an electric motor (not illustrated) which rotate casing 101 in the horizontal direction with respect to the base. That is, apparatus rotator 107 changes a direction of air suction port 105.

Figure 2:
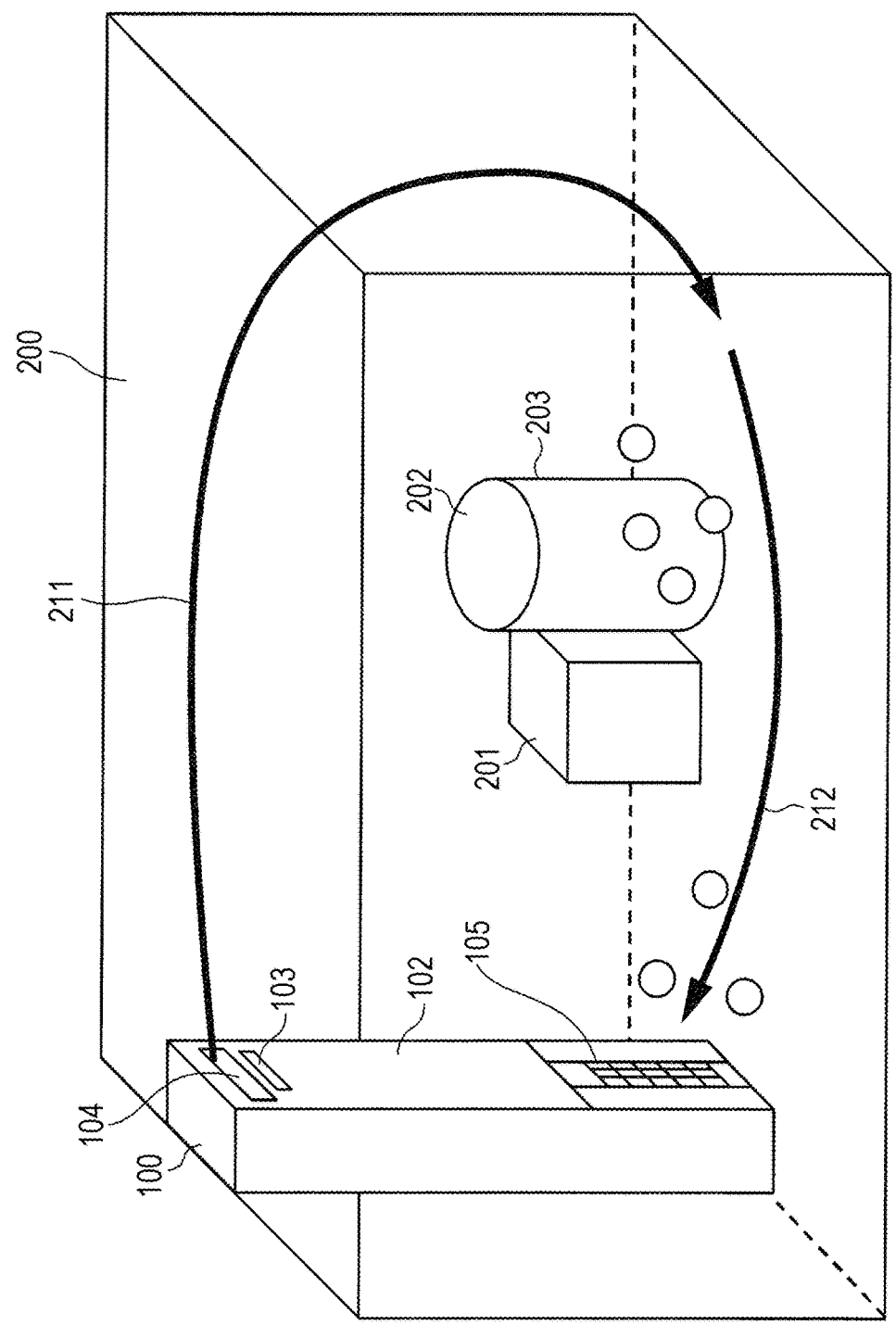
FIG. 2 is a diagram illustrating an example of an installation state of the air suction apparatus according to the exemplary embodiment.

FIG. 2 is a diagram illustrating an example of an installation state of air suction apparatus 100.

Air suction apparatus 100 is installed, for example, near a wall of room 200 with principal face 102 facing a central side of room 200.

Furniture 201 is disposed in room 200. Dust source 202 which generates dust is present at any position in room 200. The dust source is, for example, a moving person. Movement of a person is apt to cause flying of dust 203 in midair by detaching dust 203 adhered to a cloth surface or swirling up dust 203 accumulated on the floor. Hereinbelow, the position of dust source 202 is referred to as "dust generation position".

Air blown out from air blow port 104 forms indoor air flow 211. Suction air sucked by air suction port 105 forms another indoor air flow 212. Indoor air flows 211, 212 carry dust 203 flying from dust source 202 to a position near air suction port 105. As a result, a region having a higher dust concentration than surroundings (hereinbelow, referred to as "high dust concentration region") is formed in the periphery of air suction port 105. Air in the high dust concentration region is sucked to air suction port 105 by the air suction flow of air suction port 105.

However, even when the high dust concentration region is present near air suction port 105, the air suction flow in the region may be weak. In this case, the air may flow to a region other than air suction port 105, and a suction effect for dust in the high dust concentration region is thus reduced.

Thus, air suction apparatus 100 changes an air suction mode of air suction port 105 according to a change in a spatial distribution of the dust concentration (hereinbelow, referred to as "dust concentration distribution") in the periphery of air suction port 105 to change the dust concentration distribution in the periphery of air suction port 105. More specifically, air suction apparatus 100 determines the high dust concentration region, and controls the shape, the size, and the direction of air suction port 105 so that a predetermined air suction flow for effectively sucking dust in the high dust concentration region by air suction port 105 is applied to the high dust concentration region.

The high dust concentration region is, for example, a region having a dust concentration that is equal to or more than half a peak value of a dust concentration in the periphery of air suction port 105, or a region having a dust concentration that is equal to or more than a predetermined fixed value.

Configuration of Air Suction Apparatus

Next, a configuration of air suction apparatus 100 will be described.

Figure 3:
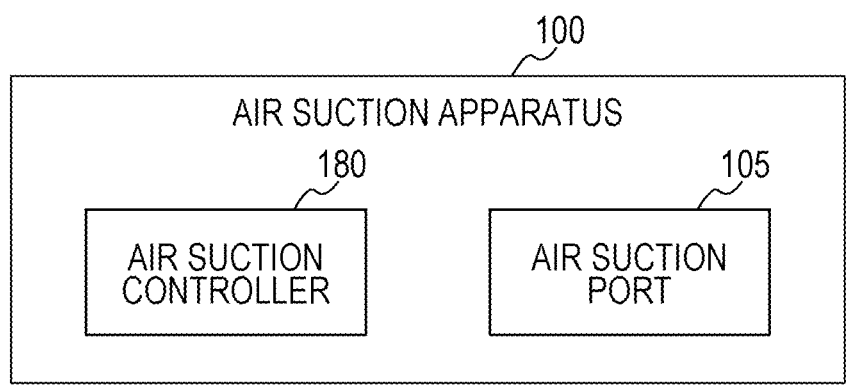
FIG. 3 is a diagram illustrating a principal configuration of the air suction apparatus according to the exemplary embodiment.

FIG. 3 is a block diagram illustrating a principal configuration of air suction apparatus 100.

In FIG. 3, air suction apparatus 100 includes air suction port 105 which is variable in an air suction mode including at least one of a shape, a size, a direction, an effective opening area, a position, or an airflow volume, and has an air suction flow distribution that changes according to a change in the air suction mode. Air suction apparatus 100 also includes air suction controller 180 which changes the air suction mode according to a change in a dust concentration distribution in the periphery of air suction port 105.

In the present exemplary embodiment, air suction controller 180 controls the shape, the size, and the direction of air suction port 105 in the air suction mode of air suction port 105.

Figure 4:
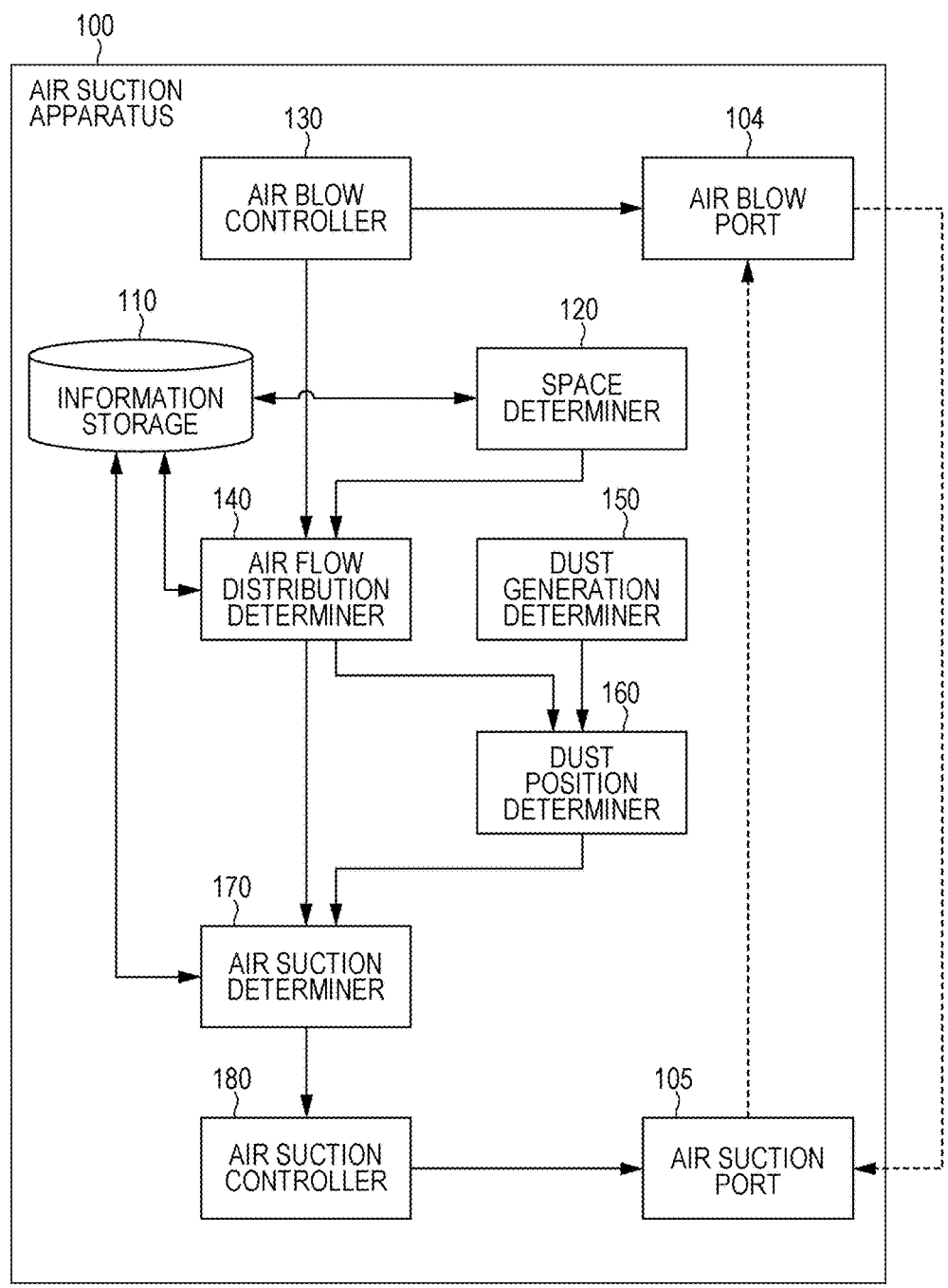
FIG. 4 is a diagram illustrating an example of a detailed configuration of the air suction apparatus according to the exemplary embodiment.

FIG. 4 is a block diagram illustrating an example of a further detailed configuration of air suction apparatus 100.

In FIG. 4, air suction apparatus 100 includes air blow port 104 and air suction port 105 (refer to FIG. 1) as described above. Air suction apparatus 100 further includes information storage 110, space determiner 120, air blow controller 130, air flow distribution determiner 140, dust generation determiner 150, dust position determiner 160, air suction determiner 170, and air suction controller 180.

Information storage 110 stores air flow information and air suction port information.

The air flow information defines, for each combination of a three-dimensional structure of a space where air blow and air suction can be performed by air suction apparatus 100 and an air blow mode of air blow port 104 such as a strength or a direction of the air blow, a spatial distribution of an air flow (hereinbelow, referred to as "air flow distribution") in the space having the structure.

The air suction port information defines, for each possible air suction mode of air suction port 105, an air suction flow distribution of air suction port 105 in the air suction mode. Details of the air flow information and the air suction port information will be described below.

Space determiner 120 determines a three-dimensional structure of a space (hereinbelow, referred to as "target space") where air suction apparatus 100 performs air blow and air suction using sensor 103 (refer to FIG. 1). That is, space determiner 120 acquires a shape of room 200 (refer to FIG. 2), a disposition of furniture 201, and a disposition of air suction apparatus 100. Space determiner 120 outputs structure information indicating the determined three-dimensional structure to air flow distribution determiner 140.

Air blow controller 130 controls the air flow volume of the air fan and the angle of the louver blades included in air blow port 104 to control the air blow mode of air blow port 104 such as the strength or the direction of air blow. Air blow controller 130 successively outputs air blow information indicating a current air blow mode to air flow distribution determiner 140.

Air blow controller 130 may input a position of a person detected by sensor 103 (refer to FIG. 1) and control the angle of the louver blades included in air blow port 104 so that air is actively blown to the input position.

Air flow distribution determiner 140 refers to the air flow information stored in information storage 110 and determines an air flow distribution in the target space based on the three-dimensional structure of the target space indicated by the structure information and the current air blow mode of air blow port 104 indicated by the air blow information. That is, air flow distribution determiner 140 estimates a state of an air flow formed in the target space. Air flow distribution determiner 140 outputs air flow distribution information indicating the determined air flow distribution to dust position determiner 160 and air suction determiner 170.

Dust generation determiner 150 detects a three-dimensional position of a person present in the target space using sensor 103 (refer to FIG. 1), defines the detected position as the dust generation position, and outputs dust generation information indicating the dust generation position to dust position determiner 160.

Dust position determiner 160 determines a region in the periphery of air suction port 105 into which dust generated at the dust generation position flows based on the air flow distribution in the target space indicated by the air flow distribution information and the dust generation position indicated by the dust generation information. That is, dust position determiner 160 estimates a path to the periphery of air suction port 105 through which the dust from dust source 202 flows, and determines a high dust concentration region in the periphery of air suction port 105. Dust position determiner 160 outputs dust region information indicating a three-dimensional position of the determined high dust concentration region to air suction determiner 170.

Air suction determiner 170 refers to the air suction port information stored in information storage 110 and determines an air suction mode that applies a predetermined air suction flow to the high dust concentration region based on the position of the high dust concentration region indicated by the dust region information and the air flow distribution indicated by the air flow distribution information. That is, air suction determiner 170 determines the shape, the size, and the direction of air suction port 105 that allow dust in the high dust concentration region to be effectively sucked by air suction port 105. Air suction determiner 170 outputs air suction mode information indicating the determined air suction mode to air suction controller 180.

In the present exemplary embodiment, air suction determiner 170 combines the air flow distribution in the target space indicated by the air flow distribution information and the air suction flow distribution in the periphery of air suction port 105 in each air suction mode indicated by the air suction port information to calculate a composite air suction flow distribution for each air suction mode. Then, air suction determiner 170 determines, as the air suction mode in which dust in the high dust concentration region is effectively sucked by air suction port 105, an air suction mode that can apply the predetermined air suction flow to the position of the high dust concentration region in the calculated composite air suction flow distribution.

Air suction controller 180 controls movable opening 106 and apparatus rotator 107 (refer to FIG. 1) so as to achieve the air suction mode indicated by the air suction mode information. That is, air suction controller 180 slides each of the shutters in movable opening 106 so that air suction port 105 has the size and the shape indicated by the air suction mode information and rotates the rotation mechanism in apparatus rotator 107 so that air suction port 105 faces the direction indicated by the air suction mode information.

Although not illustrated, air suction apparatus 100 includes, for example, a CPU (Central Processing Unit), a storage medium such as a ROM (Read Only Memory) which stores control programs, a working memory such as a RAM (Random Access Memory), and a communication circuit. In this case, functions of the units described above are achieved by executing the control programs by the CPU.

Some or all of the determiners including space determiner 120, air flow distribution determiner 140, dust generation determiner 150, dust position determiner 160, and the air suction determiner 170 may be disposed on a cloud (server device). In this case, air suction apparatus 100 further includes a wireless or wired network interface and a communicator (not illustrated) which performs communication with each of the determiners on the cloud. Air suction apparatus 100 transmits information such as a detection result obtained by sensor 103 to the cloud through the communicator and receives a determination result from each of the determiner on the cloud. Air blow controller 130 and air suction controller 180 respectively control air blow port 104 and air suction port 105 in the same manner as above based on the determination result received from the cloud.

Part or all of Information held in information storage 110 may also be held on the cloud.

Such a configuration enables the above functions to be relatively easily incorporated in a home electric appliance which has a limited calculation capacity. Further, a cost reduction is achieved.

Air suction apparatus 100 having such a configuration can change the air suction flow distribution of air suction port 105 by acquiring a change in the dust concentration distribution in the periphery of air suction port 105 and changing the air suction mode of air suction port 105 according to the change in the dust concentration distribution. Further, air suction apparatus 100 can change the air suction mode so as to apply the predetermined air suction flow to the high dust concentration region.

Details of Air Flow Information

Here, details of the air flow information stored in information storage 110 will be described.

Figure 5:
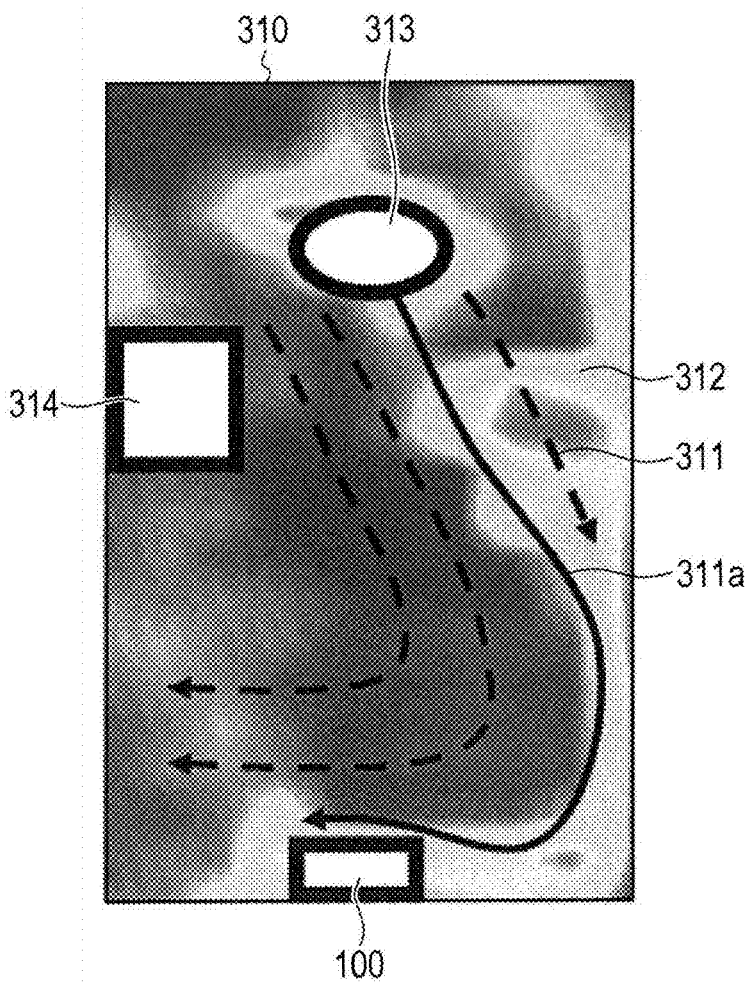
FIG. 5 is a diagram illustrating an example of an air flow distribution in the exemplary embodiment.

FIG. 5 is a diagram illustrating an example of an air flow distribution in the horizontal direction at some height. As a reference, an example of the dust concentration in each place is also illustrated.

In FIG. 5, arrow 311 indicates a direction of an air flow (hereinbelow, referred to as "air flow 311"), and shade 312 indicates the dust concentration. In space 310, air suction apparatus 100 is disposed near a wall. Further, there are dust source 313 such as a person and furniture 314 which affect the air flow in space 310.

Dust flying from person 313 is carried by air flow 311a which passes near dust source 313. In the example illustrated in FIG. 5, air blown out from air suction apparatus 100 circulates in a largely roundabout manner to a right side in the drawing, for example, by an influence of furniture 314. When air flow 311a passes near air suction apparatus 100, the dust carried by air flow 311a is also transferred to any place near air suction apparatus 100. Particles each having a large diameter such as pollen particles are not apt to be dispersed in a height direction, but apt to be stagnated at a relatively low position, for example, a position of several ten centimeters or less from a floor.

That is, when an air flow distribution in space 310 and a position of dust source 313 are acquired, it is possible to estimate a position that becomes a high dust concentration region in the periphery of air suction port 105. Air suction apparatus 100 previously prepares, as the air flow information, information that defines an air flow distribution for each combination of the three-dimensional structure of the space and the air blow mode of air blow port 104.

The air flow distribution indicated by the air flow information is acquired, for example, by simulation calculation using a computer or experimental measurement. The three-dimensional structure and the air flow distribution of the space can be classified into a plurality of patterns.

FIG. 6 is a diagram illustrating an example of contents of the air flow information.

As illustrated in FIG. 6, in air flow information 320, air flow distribution pattern 323 is described for each combination of space pattern 321 and air blow mode pattern 322.

Space pattern 321 is a pattern of a structure (layout) of the space, and defines, for example, the size of the space, the disposition of furniture, and the disposition of air suction apparatus 100 (the position and direction of air blow port 104). Air blow mode pattern 322 is a pattern of the air blow mode of air blow port 104, and defines, for example, the air flow volume and the direction of each of the louver blades. Air flow distribution pattern 323 is a pattern of the air flow distribution in the space when air blow is performed in the air blow mode defined by air blow mode pattern 322 in the space having the structure defined by space pattern 321, and defines a direction and a velocity of the air flow (air flow vector) at each position.

In this manner, the air flow information defines, for each combination of a three-dimensional structure of the space and an air blow mode of air blow port 104, the air flow distribution in the space having the structure.

Details of Air Suction Port Information

Next, details of the air suction port information stored in information storage 110 will be described.

FIGS. 7A to 7D are plan views illustrating examples of various possible air suction modes of air suction port 105.

Figure 7A:
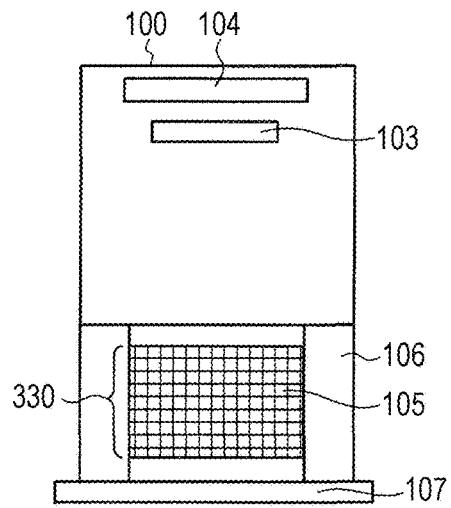
FIG. 7A is a plan view illustrating an example of an air suction mode of an air suction port in the exemplary embodiment.
Figure 7B:
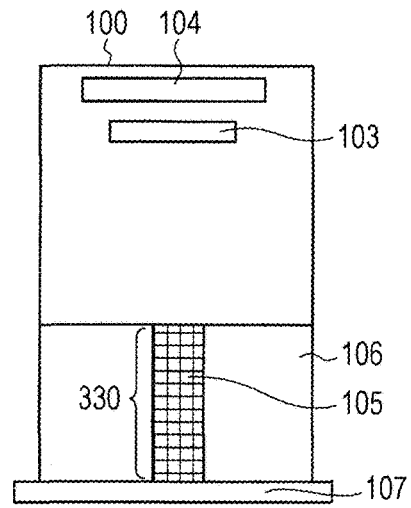
FIG. 7B is a plan view illustrating an example of the air suction mode of the air suction port in the exemplary embodiment.
Figure 7C:
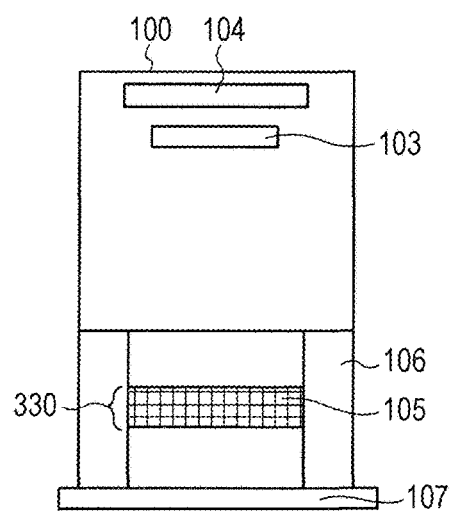
FIG. 7C is a plan view illustrating an example of the air suction mode of the air suction port in the exemplary embodiment.
Figure 7D:
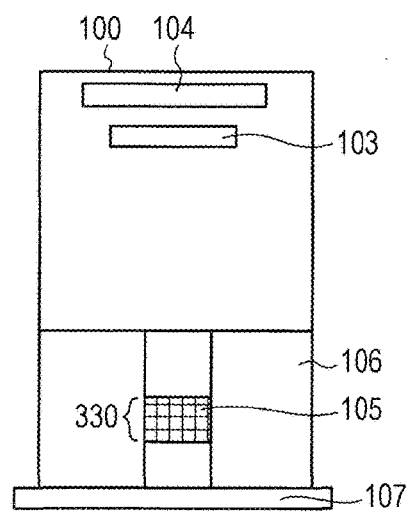
FIG. 7D is a plan view illustrating an example of the air suction mode of the air suction port in the exemplary embodiment.
Figure 8A:
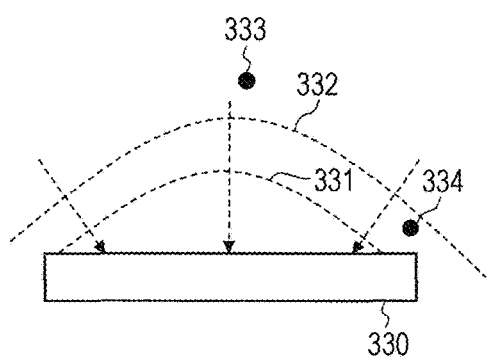
FIG. 8A is a diagram illustrating an example of an air suction flow distribution in the exemplary embodiment.
Figure 8B:
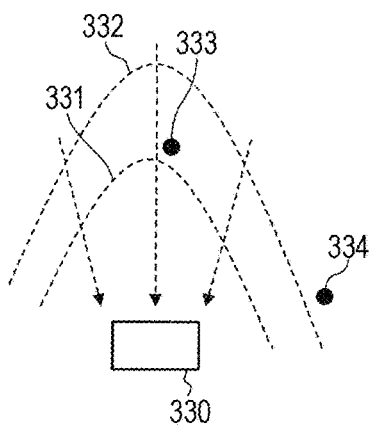
FIG. 8B is a diagram illustrating an example of the air suction flow distribution in the exemplary embodiment.
Figure 8C:
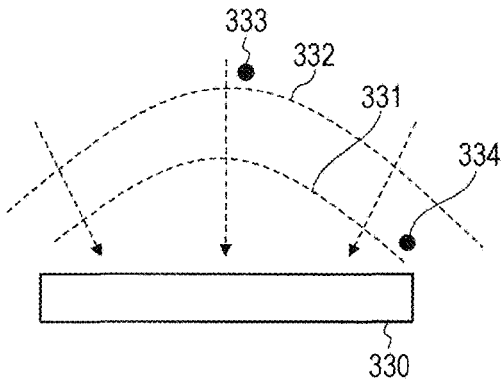
FIG. 8C is a diagram illustrating an example of the air suction flow distribution in the exemplary embodiment.
Figure 8D:
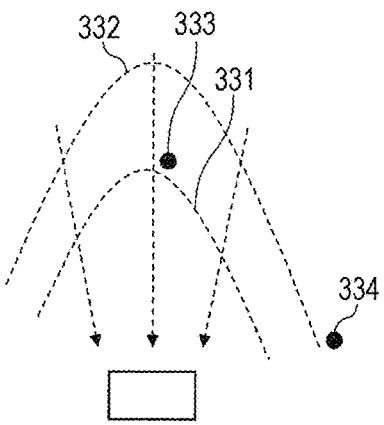
FIG. 8D is a diagram illustrating an example of the air suction flow distribution in the exemplary embodiment.

FIG. 7A is an example of a first air suction mode pattern in which air suction port 105 has a relatively large size. FIG. 7B is an example of a second air suction mode pattern in which air suction port 105 has a narrow width. FIG. 7C is an example of a third air suction mode pattern in which air suction port 105 has a low height. FIG. 7D is an example of a fourth air suction mode pattern in which air suction port 105 has a relatively small size. Possible air suction mode patterns of air suction port 105 are not limited to these four patterns.

As illustrated in FIGS. 7A to 7D, in air suction port 105, a shape and a size of region (hereinbelow, referred to as "open region") 330 which is open in a space and not covered with movable opening 106 are changed by movable opening 106. In the same suction air flow volume, the smaller an area of opening region 330 is, the higher the air flow velocity in air suction port 105 becomes. When air is sucked by air suction port 105, air in the periphery of air suction port 105 is sucked by air suction port 105 in a substantially isotropic manner due to a reduction in pressure.

FIGS. 8A to 8D are diagrams illustrating examples of the air suction flow distribution in the periphery of air suction port 105 in each of the air suction modes. FIGS. 8A to 8D respectively illustrate examples of the air suction flow distribution in the first to fourth air suction mode patterns illustrated in FIGS. 7A to 7D.

In FIGS. 8A to 8D, first contour plane 331 is a plane formed by connecting positions at which a velocity of an air flow flowing toward opening region 330 becomes a first value. Second contour plane 332 is a plane formed by connecting positions at which the velocity of the air flow flowing toward opening region 330 becomes a second value which is smaller than the first value. The second value is, for example, a value corresponding to the predetermined air suction flow.

As illustrated in FIGS. 8A to 8D, first and second contour planes 331, 332 are more distant from air suction port 105 as the area of opening region 330 is reduced. That is, air suction port 105 can apply the predetermined air suction flow to a farther position in a depth direction of air suction port 105 to suck air present at the position.

First and second contour planes 331, 332 expand in a width direction of opening region 330 as the width of opening region 330 is increased. That is, air suction port 105 can apply the predetermined air suction flow to a wider position in a width direction of air suction port 105 to suck air present at the position.

For example, first position 333 which is slightly separated from air suction port 105 on a center front of air suction port 105 is located on an outer side with respect to second contour plane 332 in the first and third air suction mode patterns and located on an inner side with respect to second contour plane 332 in the second and fourth air suction mode patterns. For example, on the contrary, second position 334 which is close to an end of air suction port 105 is located on the outer side with respect to second contour plane 332 in the second and fourth air suction mode patterns and located on the inner side with respect to second contour plane 332 in the first and third air suction mode patterns.

When opening region 330 has a small dot shape, first and second contour planes 331, 332 become close to a hemisphere. When opening region 330 has a slit shape elongated in a longitudinal direction, first and second contour planes 331, 332 become close to a shape formed by cutting a cylinder elongated in a longitudinal direction in half.

Although not illustrated, when the direction of air suction port 105 rotates, the air suction flow distribution also rotates in the same manner.

That is, when an overlap between air flow 311a (refer to FIG. 5) which carries dust and a sufficient suction air flow present inside second contour plane 332 is small, air suction apparatus 100 can change the air suction mode (shape, size, and direction) of air suction port 105 to increase the overlap. As a result, air suction apparatus 100 can draw air flow 311a carrying dust toward air suction port 105 to improve an effect of dust suction.

The dust generation position often has a certain level of height and width, for example, when a person walks in the target space. In this case, an air flow carrying dust is apt to have a large height and width. Accordingly, the high dust concentration region in the periphery of air suction port 105 is apt to expand in the height direction and the width direction. In this case, increasing the height and the width of air suction port 105 enables the effect of dust suction to be improved.

The air suction port information stored in information storage 110 defines, for each possible air suction mode of air suction port 105, an air suction flow distribution of air suction port 105 in the air suction mode.

Figure 9:
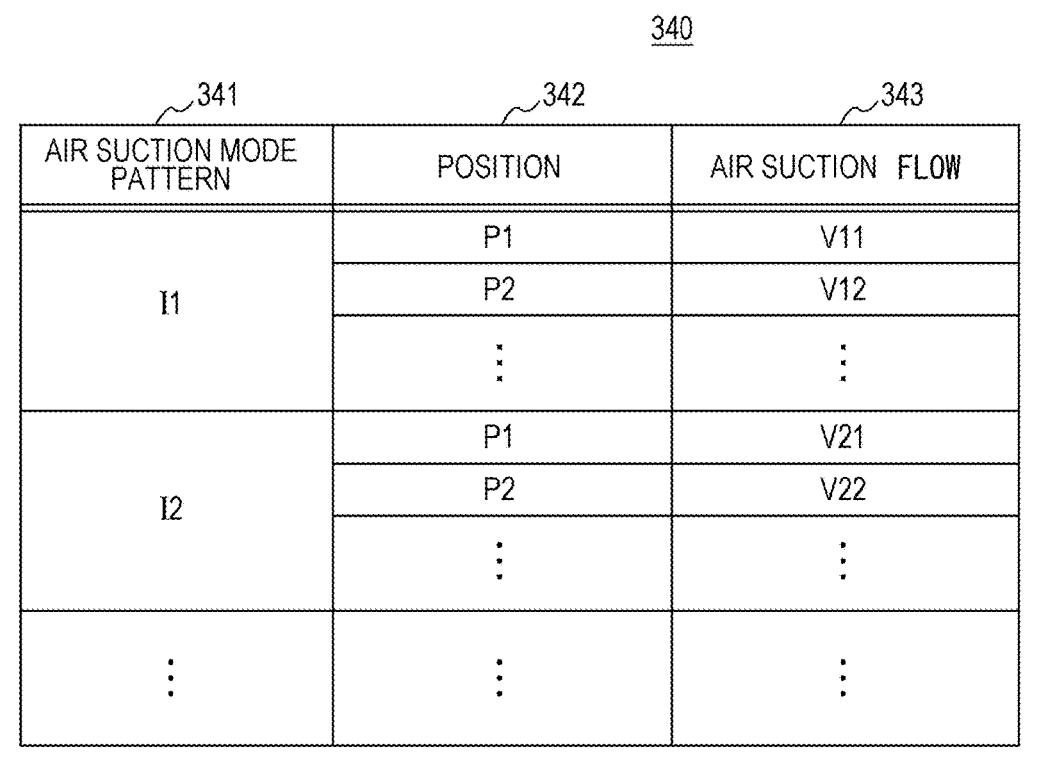

FIG. 9 is a diagram illustrating an example of the air suction port information.

As illustrated in FIG. 9, air suction port information 340 defines air suction flow 343 for each combination of air suction mode pattern 341 and position 342 in the periphery of air suction port 105.

Air suction mode pattern 341 defines a plurality of possible suction mode patterns of air suction port 105. That is, air suction mode pattern 341 corresponds to each of the different shapes of air suction port 105 illustrated in FIGS. 7A to 7D. Air suction mode pattern 341 is defined, for example, by the slide position of each of the shutters included in movable opening 106 and a rotation angle of the rotation mechanism included in apparatus rotator 107.

When a three-dimensional grid of predetermined spacing (10 cm, for example) is set in a space in the periphery of air suction port 105, position 342 defines a three-dimensional position of a representative point (a center point, for example) in each grid. That is, position 342, for example, corresponds to each of first position 333 and second position 334 illustrated in FIGS. 8A to 8D. For example, position 342 is defined by a coordinate value of a coordinate system based on a predetermined position and a predetermined direction that are fixed in a space where air suction apparatus 100 is installed and that can be associated with the position of air suction port 105 such as a center position and a direction of a base in air suction apparatus 100.

Air suction flow 343 defines an air suction flow at position 342 in the periphery of air suction port 105. That is, air suction flow 343 corresponds to a velocity of an air flow flowing to air suction port 105 at each of first position 333 and second position 334 illustrated in FIG. 8A to 8D. For example, air suction flow 343 is defined by a velocity of an air flow generated by suction of air by air suction port 105 and a direction of the air flow.

In this manner, air suction port information 340 defines the air suction flow at each position (that is, the air suction flow distribution) in the periphery of air suction port 105 for each air suction mode pattern of air suction port 105.

Operation of Air Suction Apparatus

Next, an operation of air suction apparatus 100 will be described.

Figure 10:
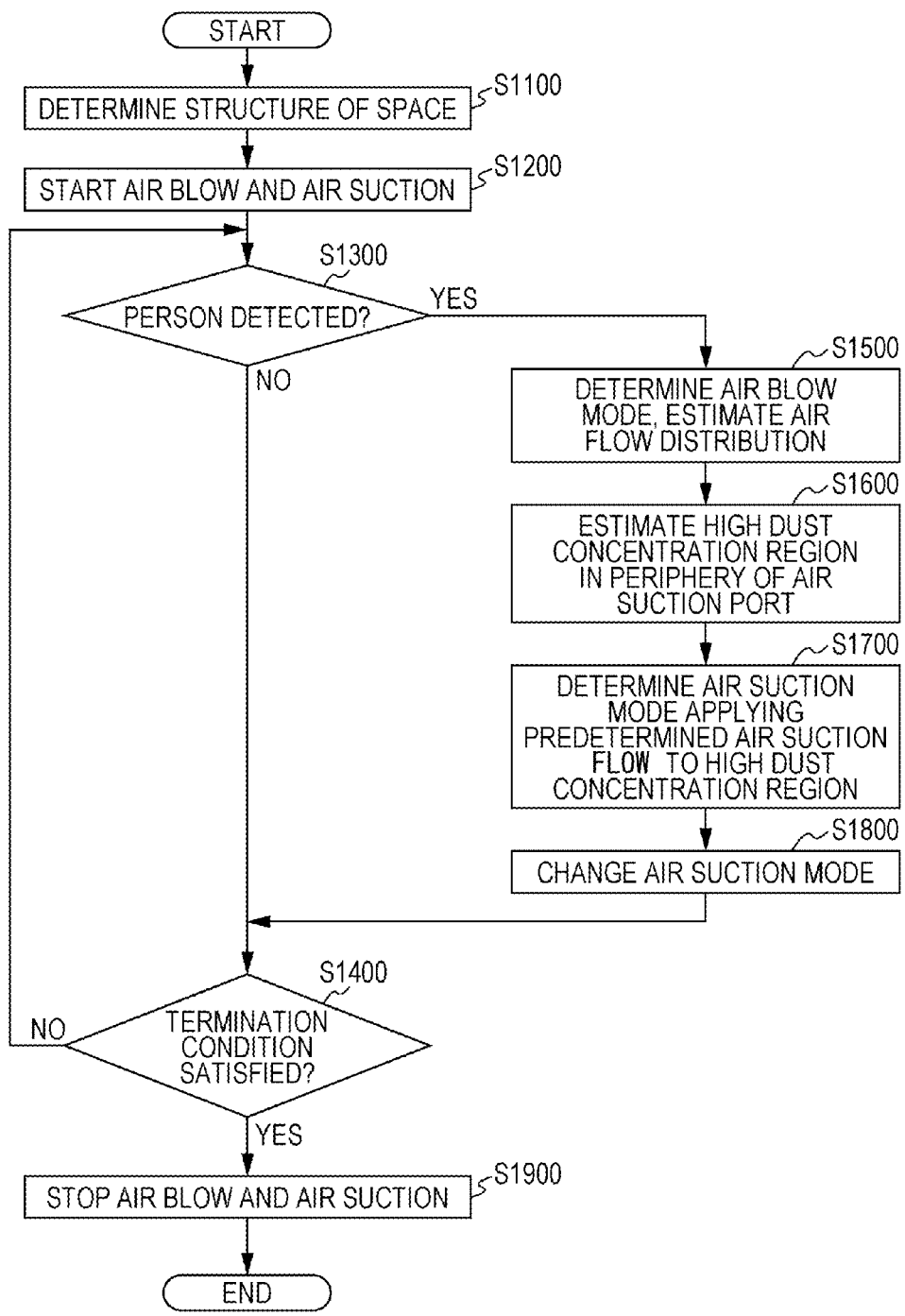
FIG. 10 is a flow chart illustrating an example of an operation of the air suction apparatus according to the exemplary embodiment.

FIG. 10 is a flow chart illustrating an example of the operation of air suction apparatus 100.

Air suction apparatus 100 starts an operation described below every time air suction apparatus 100 is installed in a new place, every time power is turned on, or every time air suction start is instructed by a user operation.

In step S1100, space determiner 120 determines a structure of a target space. For example, space determiner 120 determines, as the structure of the target space, one of space patterns 321 (FIG. 6) described in air flow information 320, the one being most similar to the structure of the target space detected by sensor 103.

In step S1200, air blow controller 130 operates an air conditioning fan to start air blow from air blow port 104 and air suction from air suction port 105.

In step S1300, dust generation determiner 150 determines whether a person (the dust source in the present exemplary embodiment) has been detected in the target space. When no person has been detected (S1300: NO), dust generation determiner 150 advances processing to step S1400.

In step S1400, air suction determiner 170 determines whether a predetermined termination condition such as an instruction of stopping the air suction by a user operation is satisfied. Air suction determiner 170 returns the processing to step S1300 and continues monitoring of the target space while the predetermined termination condition is not satisfied (S1400: NO).

When a person has been detected (S1300: YES), dust generation determiner 150 advances the processing to step S1500.

In step S1500, air flow distribution determiner 140 determines an air blow mode of air blow port 104 and estimates an air flow distribution in the target space from the determined structure of the target space and the determined air blow mode.

In step S1600, dust position determiner 160 estimates a high dust concentration region in the periphery of air suction port 105 from a position where the person has been detected, that is, the dust generation position and the estimated air flow distribution in the target space. The high dust concentration region is a current high dust concentration region or a high dust concentration region after a few seconds.

In step S1700, air suction determiner 170 determines an air suction mode that applies a predetermined air suction flow to the estimated high dust concentration region based on the estimated air flow distribution in the target region and the air suction flow distribution in each air suction mode.

In step S1800, air suction controller 180 changes the air suction mode of air suction port 105 to the determined air suction mode.

Air suction apparatus 100 continuously performs the above operation that changes the air suction mode of air suction port 105 according to the position of the person. Then, when the predetermined termination condition is satisfied (S1400: YES), air suction determiner 170 advances the processing to step S1900.

In step S1900, air blow controller 130 stops the air conditioning fan to stop the air blow from air blow port 104 and the air suction from air suction port 105 to finish the series of processing.

Such an operation enables air suction apparatus 100 to acquire a change in the dust concentration distribution in the periphery of air suction port 105 following the position of the person (dust source) and to change the air suction flow distribution of air suction port 105 so as to apply the predetermined air suction flow to the high dust concentration region.

Figure 11:
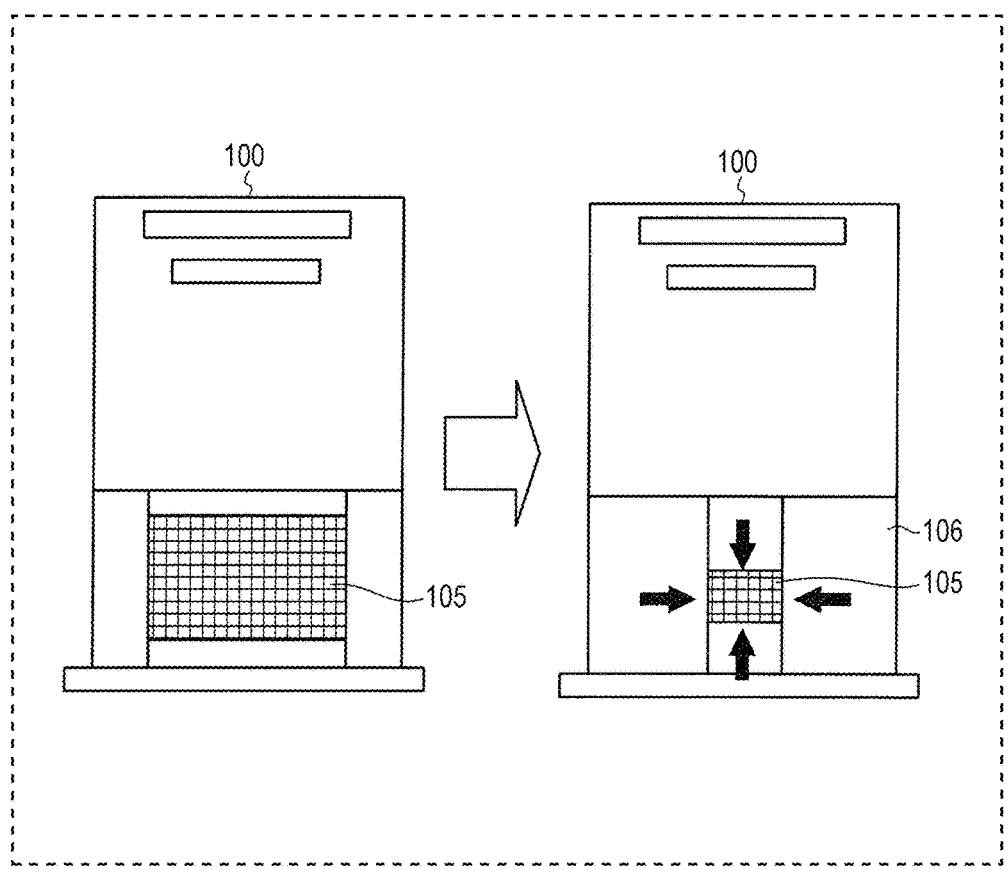
FIG. 11 is a diagram illustrating a first example of a state of a change in the air suction mode in the exemplary embodiment.
Figure 12:
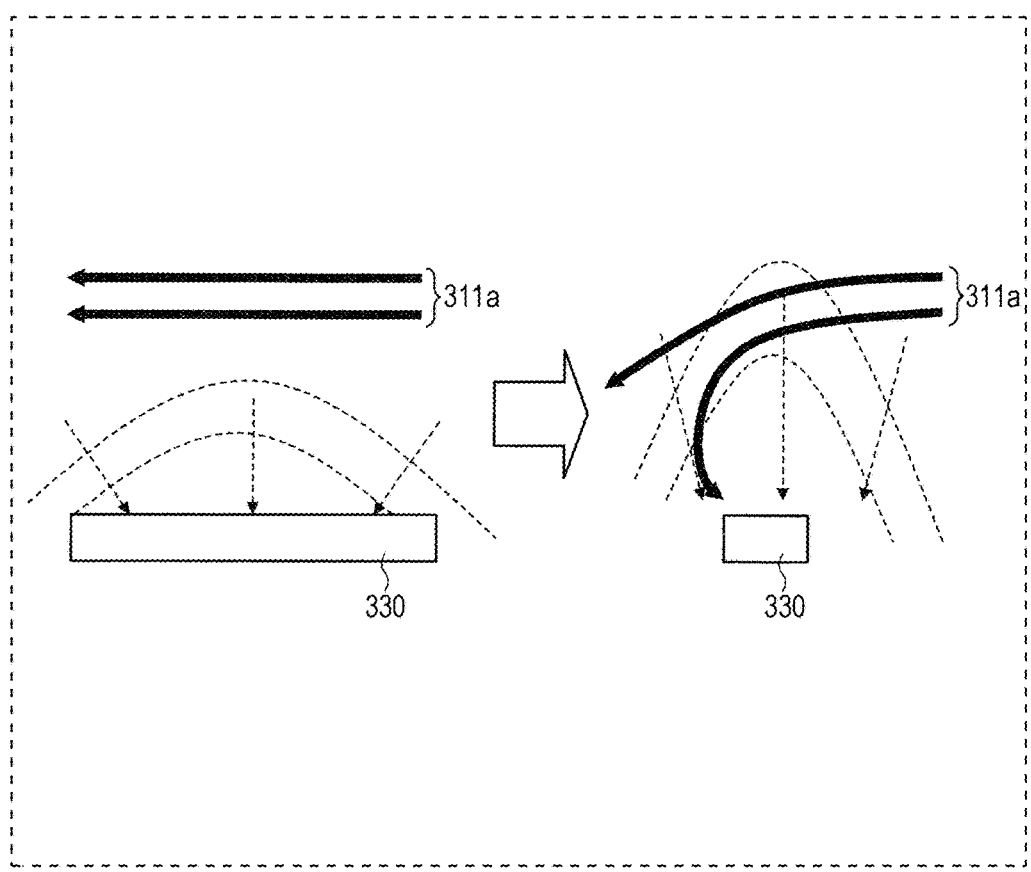
FIG. 12 is a diagram illustrating an example of a state of a change in a dust suction effect caused by the change in the air suction mode illustrated in FIG. 11.

FIG. 11 is a diagram illustrating an example of a state in which air suction apparatus 100 changes the shape (size) of air suction port 105 and corresponds to FIGS. 7A to 7D. FIG. 12 is a diagram illustrating an example of a state in which the change in the air suction mode illustrated in FIG. 11 causes a change in the air suction flow distribution, so that air in the high dust concentration region is efficiently sucked. FIG. 12 corresponds to FIGS. 8A to 8D.

As illustrated in FIG. 11, air suction apparatus 100 changes the size of air suction port 105 so as to be reduced. In this case, as illustrated in FIG. 12, for example, air flow 311a which carries dust and passes through a position away from opening region 330 of air suction port 105 is easily sucked by air suction port 105.

Figure 13:
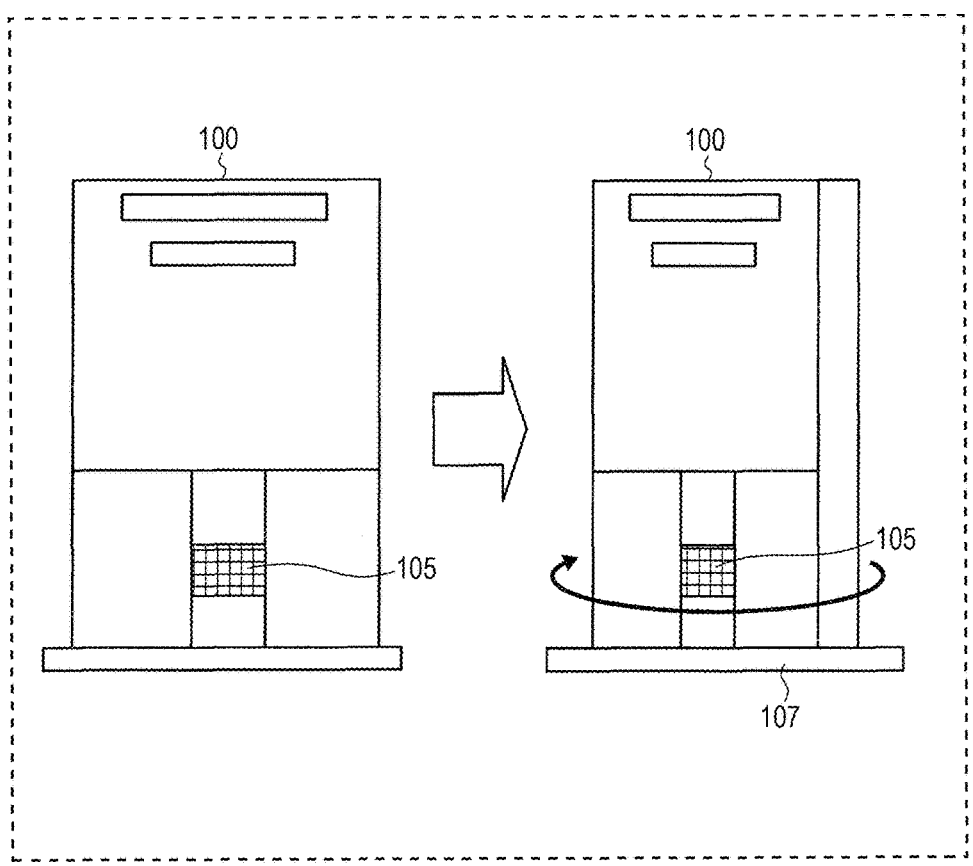
FIG. 13 is a diagram illustrating a second example of the state of the change in the air suction mode in the exemplary embodiment.
Figure 14:
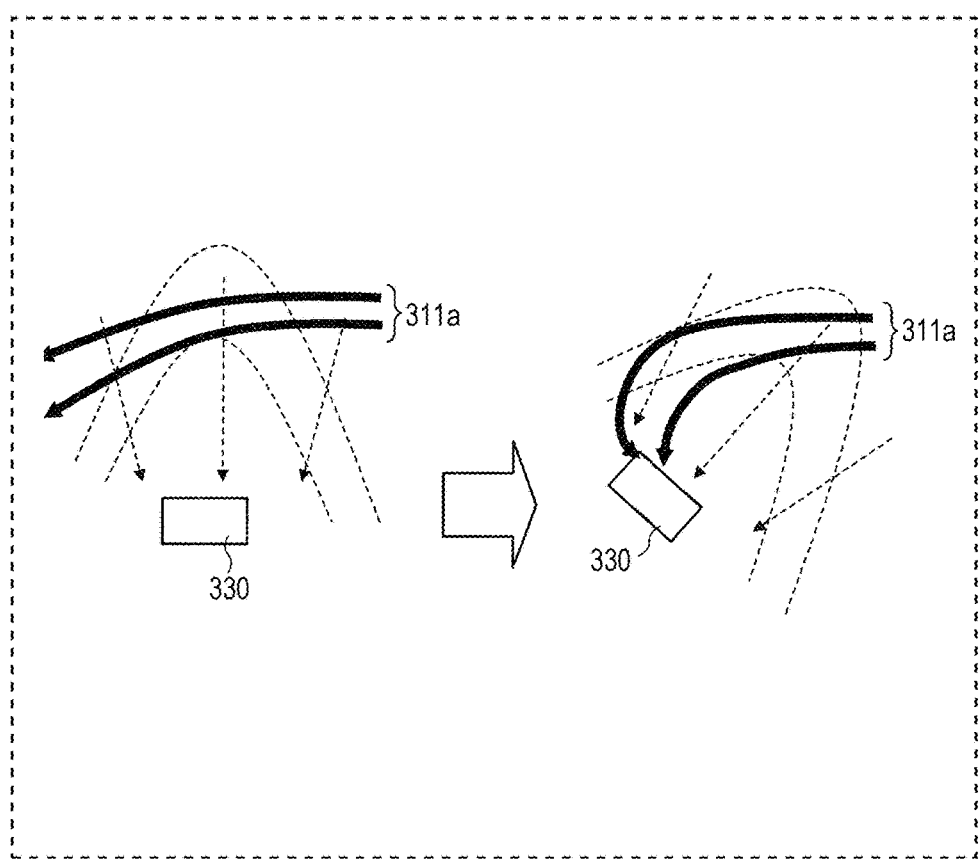
FIG. 14 is a diagram illustrating an example of a state of a change in the dust suction effect caused by the change in the air suction mode illustrated in FIG. 13.

FIG. 13 is a diagram illustrating an example of a state in which air suction apparatus 100 changes the direction of air suction port 105 and corresponds to FIGS. 7A to 7D. FIG. 14 is a diagram illustrating an example of a state in which the change in the air suction mode illustrated in FIG. 13 causes a change in the air suction flow distribution, so that air in the high dust concentration region is efficiently sucked. FIG. 14 corresponds to FIGS. 8A to 8D.

As illustrated in FIG. 13, air suction apparatus 100 rotates the direction of air suction port 105 in a clockwise direction when viewed from above. In this case, as illustrated in FIG. 14, for example, air flow 311a which carries dust and passes through a position away from opening region 330 of air suction port 105 is easily sucked by air suction port 105.

Air flow 311a carrying dust may flow in a direction that largely differs from a main suction direction (center direction) of air suction port 105 and may have a high velocity. In this case, as illustrated on a left side of FIG. 14, merely reducing the size of air suction port 105 is not sufficient to effectively guide air flow 311a carrying dust to air suction port 105. In this case, as illustrated in FIG. 13, the main suction direction (center direction) of air suction port 105 is brought close to the direction of air flow 311a carrying dust. This enables air flow 311a carrying dust to be more effectively guided to air suction port 105 as illustrated on a right side in FIG. 14.

Effect of Present Exemplary Embodiment

As described above, air suction apparatus 100 according to the present exemplary embodiment includes air suction port 105 which is variable in the air suction mode including the shape, the size, and the direction and has an air suction flow distribution that changes according to a change in the air suction mode; and air suction controller 180 which changes the air suction mode according to a change in the dust concentration distribution in the periphery of air suction port 105.

Air suction apparatus 100 having such a configuration can easily and effectively suck dust.

Another Determination Method for Space Structure

Space determiner 120 may determine the structure of the target space by a method other than the method described above.

For example, space determiner 120 receives input of the structure of the target space from a user through a user interface such as a liquid crystal display with a touch panel. At this time, space determiner 120 may present a plurality of space patterns as alternatives to the user.

Other Determination Methods for Dust Generation Position

Dust generation determiner 150 may determine the dust generation position in the target space by a method other than the method described above.

For example, dust generation determiner 150 may detect a dust concentration at each position using a dust concentration sensor whose detection target is the target space and determines a position having a dust concentration of a predetermined level or higher as a dust generation position. For example, as the dust concentration sensor, it is possible to employ a known sensor, that is widely installed in an air cleaner, that acquires a concentration of dust through a scattering state of light emitted from a laser or LED (Light Emitting Diode).

Alternatively, dust generation determiner 150 may perform communication with a plurality of dust concentration sensors disposed in the target space, acquire a dust concentration near each of the dust concentration sensors detected by the dust concentration sensor, and perform linear interpolation on values between the sensor positions to determine the dust generation position. Alternatively, dust generation determiner 150 may perform communication with a dust concentration sensor that automatically moves on a floor or in midair and acquire a dust concentration at each position to determine the dust generation position.

Other Determination Methods for Air Flow Distribution

Air flow distribution determiner 140 may determine the air flow distribution in the target space by a method other than the method described above.

For example, air flow distribution determiner 140 calculates the air flow distribution in the target space by simulation calculation based on the structure of the target space and the air blow mode. In this case, the air flow information is information required for the simulation calculation.

For example, air flow distribution determiner 140 detects a direction and a velocity of an air flow at each position using an air flow sensor whose detection target is the target space. For example, it is possible to employ, as the air flow sensor, known sensors such as an ultrasonic air direction/air velocity sensor which estimates an air velocity and an air direction from a three-dimensional ultrasonic response and an air velocity sensor which measures a change in a temperature distribution formed by a heater and calculates an air velocity and an air direction.

Alternatively, air flow distribution determiner 140 may perform communication with a plurality of air flow sensors disposed in the target space, acquire a direction and a velocity of an air flow near each of the air flow sensors detected by the air flow sensor, and perform linear interpolation on values between the sensor positions to determine the air flow distribution. Alternatively, air flow distribution determiner 140 may perform communication with an air flow sensor that automatically moves on a floor or in midair and acquire a direction and a velocity of an air flow at each position to determine the air flow distribution.

When air flow distribution determiner 140 determines the air flow distribution using the air flow sensor in this manner, information storage 110 may not necessarily store the air flow information.

Other Determination Methods for High Dust Concentration Region

Dust position determiner 160 may determine the high dust concentration region by a method other than the method described above.

For example, the air flow information defines an air flow that carries dust from the dust source, the air flow being obtained by simulation calculation or experimental measurement, for each combination of the space pattern and the dust generation position. In this case, dust position determiner 160 determines, as the high dust concentration region, a position where the air flow carrying dust from the dust source passes through the periphery of air suction port 105 based on the space pattern of the target space and the dust generation position.

For example, dust position determiner 160 may include a function of air flow distribution determiner 140 which determines the air flow distribution by simulation calculation and may perform the determination of the air flow distribution and the determination of the high dust concentration region without distinction therebetween. That is, dust position determiner 160 may calculate an air flow carrying dust from the dust source by simulation calculation and determine a position where the calculated air flow passes through the periphery of air suction port 105 as the high dust concentration region.

For example, dust position determiner 160 may detect a dust concentration at each position using a dust concentration sensor whose detection target is the periphery of air suction port 105 and determine a region having a higher dust concentration than surroundings as the dust generation position. The known sensor described above can be employed as the dust concentration sensor.

Alternatively, dust position determiner 160 may perform communication with a plurality of dust concentration sensors disposed in the periphery of air suction port 105, acquire a dust concentration near each of the dust concentration sensors detected by the dust concentration sensor, and perform linear interpolation on values between the sensor positions to determine the high dust concentration region. The dust concentration sensors are disposed, for example, at approximately 30 cm intervals. Alternatively, dust position determiner 160 may perform communication with a dust concentration sensor that automatically moves on a floor or in midair and acquire a dust concentration at each position to determine the high dust concentration region.

When dust position determiner 160 determines the high dust concentration region using the dust concentration sensor in this manner, air suction apparatus 100 may not necessarily include space determiner 120, air flow distribution determiner 140, and dust generation determiner 150.

Other Selection Methods for Air Suction Mode

Air suction determiner 170 may determine the air suction mode by a method other than the method described above.

For example, air suction determiner 170 determines, as an air suction mode in which dust in the high dust concentration region is effectively sucked by air suction port 105, an air suction mode pattern in which the direction of the air flow of the air suction flow comes close to the direction of the air flow in the high dust concentration region.

Alternatively, for example, the air suction port information defines, for each position in the periphery of air suction port 105, an air suction mode pattern that applies a predetermined air suction flow to the position. Air suction determiner 170 determines, as the air suction mode in which dust in the high dust concentration region is effectively sucked by air suction port 105, an air suction mode pattern in which a larger part of the high dust concentration region has the predetermined air suction flow.

Air flow distribution determiner 140 may calculate an air flow distribution for each air suction mode pattern when air suction is performed from air suction port 105 by simulation calculation. In this case, the air suction port information is information required for the simulation calculation.

Alternatively, information storage 110 may store such an air flow distribution including the air suction flow of air suction port 105 as integrated information of the air flow information and the air suction port information. In this case, air suction determiner 170 determines, as the air suction mode in which dust in the high dust concentration region is effectively sucked by air suction port 105, an air suction mode pattern in which an air flow passing through the dust generation position reaches air suction port 105 for each calculated or stored air flow distribution in each air suction mode pattern.

For example, air suction determiner 170 calculates an air flow carrying dust from the dust source for each air suction mode pattern by simulation calculation. Then, air suction determiner 170 determines, as the air suction mode in which dust in the high dust concentration region is effectively sucked by air suction port 105, an air suction mode pattern in which the calculated air flow reaches air suction port 105. In this case, the air flow information and the air suction port information are information required for the simulation calculation.

For example, a dust concentration sensor which measures the dust concentration of air sucked by air suction port 105 may be disposed on the duct, and air suction determiner 170 may determine the air suction mode in which dust in the high dust concentration region is effectively sucked by air suction port 105 based on a change in the dust concentration of the sucked air. That is, in this case, air suction apparatus 100 may not necessarily include space determiner 120, air flow distribution determiner 140, dust generation determiner 150, and dust position determiner 160.

Air suction determiner 170 may determine the air suction mode in which dust in the high dust concentration region is effectively sucked by air suction port 105 based on information other than the position of the high dust concentration region and the direction and velocity of an air flow at the position of the high dust concentration region.

For example, when sensor 103 detects a standing person, air suction determiner 170 determines to change the shape of air suction port 105 into a shape elongated in the vertical direction on an assumption that the dust generation position extends over a wide range in the vertical direction. On the other hand, when sensor 103 detects a lying person, air suction determiner 170 determines to change the shape of air suction port 105 into a shape elongated in the horizontal direction on an assumption that the dust generation position extends over a wide range in the horizontal direction.

Other Examples of Air Suction Mode

A manner of a change in the air suction mode of air suction port 105 is not limited to the above examples.

For example, air suction port 105 may be variable in the effective opening area, the position, and the air flow volume in addition to the shape, the size, and the direction. Air suction port 105 may be variable only in the shape, the size, the direction, the effective opening area, the position, or the air flow volume. However, in air suction port 105, the air suction flow distribution is required to change according to a change in the air suction mode. The change of the effective opening area may be achieved by, for example, changing the direction of the louver. The change of the position may be achieved by, for example, moving air suction port 105 or changing one of a plurality of air suction ports 105 to be used. The change of the air flow volume may be achieved by, for example, changing a rotation speed of the air fan or changing an opening degree of a damper disposed on the duct.

Air suction apparatus 100 may have a configuration in which only a part having air suction port 105 (a lower half of air suction apparatus 100, for example) rotates. Alternatively, the change of the direction of air suction port 105 may be achieved not by a change in a normal line direction of air suction port 105, but by a change in the direction of the louver or by the change in the direction of the louver in addition to the change in the normal line direction of air suction port 105. In these cases, a position and a direction of the other part of air suction apparatus 100 do not change. Thus, it is possible to reduce an increase in the number of air flow distribution patterns.

Other Modifications

In air suction apparatus 100, the disposition of air blow port 104 and air suction port 105, the configuration of air blow port 104, and the configuration of air suction port 105 are not limited to the above examples. For example, air blow port 104 and air suction port 105 may be disposed separately in the horizontal direction or may be disposed in different rooms. Further, a plurality of air blow ports 104 and a plurality of air suction ports 105 may be provided.

A distribution shape of a region having a high dust concentration tends to be long toward a position where air blow port 104 is located. This is because an air flow carrying dust is apt to receive distortion by viscosity of air blown from air blow port 104 and to have a shape drawn to air blow port 104. Thus, in particular, when air blow port 104 and air suction port 105 are disposed separately from each other, air suction controller 180 desirably sets an air suction mode in which the air suction flow distribution has a shape elongated toward the position of air blow port 104 as an initial state of the air suction mode of air suction port 105.

A concentration of any substance inside a space may be desirably increased. An example of such a substance includes a substance that is useful for a human body or home facilities. In such a case, air suction determiner 170 may employ an air suction mode that applies a lower air suction flow to a region in which the concentration of the substance is higher than surroundings or may employ an air suction mode that applies a higher air suction flow to a region in which the concentration of the substance is lower than surroundings.

When the air blow mode is fixed, air suction apparatus 100 may not necessarily include air blow controller 130. Further, air suction apparatus 100 may not necessarily include air blow port 104 and air blow controller 130. In this case, substantially the same volume of air as sucked by air suction port 105 is supplied to the target space where air suction port 105 performs air suction by a ventilation port or an air suction port of another apparatus.

Dust as a suction target of air suction apparatus 100 may be limited to a predetermined substance, a predetermined size, or a predetermined weight.

A part of the configuration of air suction apparatus 100 described above may be physically separated from the other part of the configuration of air suction apparatus 100. In this case, each of the separated parts of the configuration is required to include a communicator for performing communication with the other part.

Summary of Present Disclosure

An air suction apparatus of the present disclosure includes an air suction port that is variable in an air suction mode including at least one of a shape, a size, a direction, an effective opening area, a position, or an air flow volume of an air suction port; and an air suction controller that controls, according to a change in a dust concentration distribution in a periphery of the air suction port, the air suction port to vary at least one of the shape, the size, the direction, the effective opening area, the position, or the air flow volume of the air suction port such that an air suction flow distribution is changed according to the variation of the air suction mode.

In the air suction apparatus, when there is a high dust concentration region having a higher dust concentration than surroundings, the air suction controller may change the air suction mode from a first air suction mode to a second air suction mode in which air in the high dust concentration region is sucked with a higher efficiency than the first air suction mode.

The air suction apparatus may further include a dust position determiner that determines a high dust concentration region having a higher dust concentration than surroundings in the periphery of the air suction port and an air suction determiner that determines the air suction mode that applies a predetermined air suction flow to the high dust concentration region. The air suction controller may control the air suction port so as to become the determined air suction mode.

The air suction apparatus may further include an air flow distribution determiner that determines an air flow distribution in a space where the air suction port performs air suction and a dust generation determiner that determines a dust generation position. The dust position determiner may estimate the high dust concentration region based on the air flow distribution and the dust generation position.

In the air suction apparatus, the dust generation determiner may detect a position of a person and estimate the detected position as the dust generation position.

The air suction apparatus may further include an air blow port that performs air blow to a space where the air suction port performs air suction and a space determiner that determines a structure of the space. The air flow distribution determiner may estimate the air flow distribution based on the structure.

The air suction apparatus may further include an information storage that stores air flow information that defines, for each of possible structures of a space where the air suction is performed, an air flow distribution of a space having the structure. The air flow distribution determiner may estimate the air flow distribution in the space where the air suction is performed with reference to the air flow information.

In the air suction apparatus, the air flow distribution determiner may determine the air flow distribution in the space including the periphery of the air suction port for each of possible air suction modes of the air suction port and the air suction determiner may determine the air suction mode based on the air flow distribution in the periphery of the air suction port in each of the air suction modes.

In the air suction apparatus, the air flow distribution determiner may measure the air flow distribution.

In the air suction apparatus, the dust position determiner may measure the dust concentration distribution to determine the high dust concentration region.

The air suction apparatus may further include an information storage that stores air suction port information that defines, for each of the air suction modes, an air suction flow distribution of the air suction port in the air suction mode. The air suction determiner may determine the air suction mode with reference to the air suction port information.

An air suction method of the present disclosure includes a step of acquiring a change in a dust concentration distribution in a periphery of an air suction port and a step of changing an air suction mode of the air suction port, the air suction mode including at least one of a shape, a size, a direction, an effective opening area, a position, or an air flow volume, according to the change in the dust concentration distribution to change an air suction flow distribution of the air suction port.

In the above embodiment, there has been described an example in which the present disclosure is achieved by hardware. However, the present disclosure may be achieved by software in cooperation with hardware.

The air suction apparatus and the air suction method of the present disclosure are useful as an air suction apparatus and an air suction method that can easily and effectively suck dust.

What is claimed is:

1. An air suction apparatus comprising:
   an air suction port provided on a surface of the air suction apparatus; and
   an air suction controller that changes, according to a change in a dust concentration distribution in a periphery of the air suction port, an air suction mode, wherein the air suction mode is determined based on at least one of a shape, a size, a direction, an effective opening area, a position, or an air flow volume of the air suction port;
   a dust position determiner that determines a dust concentration region having a higher dust concentration than surroundings in the periphery of the air suction port;
   an air suction determiner that determines the air suction mode for applying a predetermined air suction flow to the determined dust concentration region;
   an air flow distribution determiner that determines an air flow distribution in a space where the air suction port performs air suction; and
   a dust generation determiner that determines a dust generation position, wherein
   the air suction controller controls the air suction port based on the determined air suction mode, and
   the dust position determiner estimates the dust concentration region based on the air flow distribution and the determined dust generation position.

2. The air suction apparatus according to claim 1, wherein the dust generation determiner detects a position of a person to determine the dust generation position.

3. The air suction apparatus according to claim 1, further comprising:
   an air blower that performs air blow to a space where the air suction port performs air suction; and
   a space determiner that determines a characteristics of the space, wherein
   the air flow distribution determiner estimates the air flow distribution based on the determined characteristics of the space.

4. The air suction apparatus according to claim 1 further comprising:
   a computer readable medium that stores air flow distribution information for each of possible characteristics of a space where the air suction is performed, wherein
   the air flow distribution determiner estimates the air flow distribution in the space where the air suction is performed with reference to the air flow distribution information.

5. The air suction apparatus according to claim 1, wherein
   the air flow distribution determiner determines the air flow distribution in the space including the periphery of the air suction port for each of possible air suction modes, and
   the air suction determiner determines an air suction mode based on the determined air flow distribution in the periphery of the air suction port.

6. The air suction apparatus according to claim 1, wherein the air flow distribution determiner measures the air flow distribution to determine.

7. The air suction apparatus according to claim 1, wherein the dust position determiner measures the dust concentration distribution to determine the dust concentration region.

8. The air suction apparatus according to claim 1 further comprising:
   a computer readable medium that stores air suction port information which defines an air suction flow distribution of the air suction port in the air suction mode, wherein
   the air suction determiner determines the air suction mode with reference to the air suction port information.

9. The air suction apparatus according to claim 1 further comprising:
   a communicator that transmits information about at least one of detection of a position of a person, measurement of an air flow distribution, or measurement of a dust concentration distribution, wherein
   the communicator receives, as a response to the transmitted information, a determination result of the air suction mode that applies a predetermined air suction flow to a dust concentration region having a higher dust concentration than surroundings in the periphery of the air suction port, and
   the air suction controller controls the air suction port based on the air suction mode received from the communicator.

10. An air suction method comprising:
    detecting, by a dust position determiner, a dust concentration distribution in a periphery of an air suction port;
    determining, by the dust position determiner, a dust concentration region having a higher dust concentration distribution than surroundings in the periphery of the air suction port by the dust position determiner;
    determining, by an air suction determiner, an air suction mode for applying a predetermined air suction flow to the determined dust concentration region;
    determining, by an air suction flow distribution determiner, an air suction flow distribution in a space where the air suction port performs air suction;
    determining, by a dust generation determiner, a dust generation position, and changing, by an air suction controller, at least one of a shape, a size, a direction, an effective opening area, a position, or an air flow volume of the air suction port according to the detected dust concentration distribution to cause a change in the air suction flow distribution of the air suction port, wherein the air suction controller controls the air suction port based on the determined air suction mode, and the dust position determiner estimates the dust concentration region based on the air suction flow distribution and the determined dust generation position.

\* \* \* \* \*